United States Patent [19]

Shuck et al.

[11] Patent Number: 6,112,859
[45] Date of Patent: Sep. 5, 2000

[54] BRAKE SYSTEM WARNING DEVICE

[76] Inventors: Robert Shuck, 6909 N. Blackberry Pl., McNeal, Ariz. 85617; Eddie Shuck, 1983 Barnett Rd., Bisbee, Ariz. 85603

[21] Appl. No.: 08/844,094

[22] Filed: Apr. 18, 1997

Related U.S. Application Data

[63] Continuation-in-part of application No. 60/035,649, Jan. 23, 1997.

[51] Int. Cl.[7] ........................................ F16D 66/00
[52] U.S. Cl. ................................ 188/1.11 L; 188/1.11 E; 340/454
[58] Field of Search .................. 188/1.11 L, 1.11 E; 73/121, 129; 116/208, 284, 289; 340/453, 454, 514, 515

[56] References Cited

U.S. PATENT DOCUMENTS

| | | |
|---|---|---|
| 3,356,188 | 12/1967 | Goldman et al. . |
| 3,673,563 | 6/1972 | Thielen et al. . |
| 3,779,080 | 12/1973 | Smith . |
| 3,974,477 | 8/1976 | Hester . |
| 4,045,768 | 8/1977 | Kilmek . |
| 4,279,214 | 7/1981 | Thorn . |
| 4,523,791 | 6/1985 | Belart et al. . |
| 4,555,144 | 11/1985 | Belart et al. . |
| 4,642,603 | 2/1987 | Martinez, Jr. . |
| 4,658,936 | 4/1987 | Moseley . |
| 4,699,435 | 10/1987 | Wupper . |
| 4,757,300 | 7/1988 | Sebalos . |
| 4,776,438 | 10/1988 | Schandelmeier . |
| 4,790,607 | 12/1988 | Atkins . |
| 4,800,991 | 1/1989 | Miller . |
| 4,879,964 | 11/1989 | Emerson, Jr. . |
| 4,886,332 | 12/1989 | Wolfe . |
| 4,905,800 | 3/1990 | Mathews . |
| 4,937,554 | 6/1990 | Herman . |
| 4,964,679 | 10/1990 | Rath . |
| 5,044,302 | 9/1991 | Goldfein et al. . |
| 5,079,947 | 1/1992 | Feldmann et al. . |
| 5,189,391 | 2/1993 | Feldmann et al. . |
| 5,285,190 | 2/1994 | Humphreys et al. . |
| 5,310,023 | 5/1994 | Martinez .............................. 188/1.11 L |
| 5,433,296 | 7/1995 | Webberley .......................... 188/1.11 L |
| 5,493,495 | 2/1996 | Naito et al. . |

*Primary Examiner*—Robert J. Oberleitner
*Assistant Examiner*—Mariano Sy
*Attorney, Agent, or Firm*—Mark E. Ogram P.C.

[57] ABSTRACT

A monitoring system for a vehicle's air-brakes in which the push-rod extending from the brake chamber engages an electrical switch. The electrical switch, if moved to a preselected position (indicating that adjustment of the push-rod's connection to the brake is warranted) transmits electrical energy or other such signal to an alarm within the cab of the vehicle where either an auditory alarm is sounded or a warning lamp is illuminated. The monitoring system is operationally checked through the use of several alternative mechanisms. In one such check mechanism, a switch located near the warning lamp, allows the operator to transmit electrical energy to the remote switch located at the push-rod where the electrical energy is transmitted back to the warning lamp. In another check mechanism, a switch located near the warning lamp is used to engage a solenoid which pushes the remote switch into a transmitting position to check the entire monitoring system. In one embodiment of the invention, through the use of flip-flop switches, once the warning lamp has been activated, it remains illuminated so that, when the vehicle is returned to the garage, the mechanic is easily able to determine if the air-brakes need to be adjusted.

10 Claims, 4 Drawing Sheets

BRAKE SYSTEM WARNING DEVICE

This is a continuation-in-part of U.S. Provisional patent application Ser. No. 60/035,649, filed Jan. 23, 1997, and entitled "Brake System Warning Device".

BACKGROUND OF THE INVENTION

This invention relates generally to vehicles and more particularly to air braking systems.

Air brakes are used in a wide variety of vehicles from semi-trucks to school buses. Air brakes are extremely useful and have been historically proven to be very effective. Generally in operation, a brake chamber is pressurized to force a push-rod forward to engage the braking mechanism (i.e. brake shoes or disc brakes) to engage the wheel drum.

While the mechanism works most of the time, as the brakes wear, the push-rod must move further to effectuate proper engagement. At some point though, the brake chamber's maximum range of motion is reached and the brake does not engage properly.

For this reason, a variety of safety regulations have-been enacted which either require or suggest that the operator of the vehicle inspect the brake chamber's actual range of motion to make sure that the limit of effectiveness has not been reached; and if the range of motion is nearing its limit, to adjust the slack adjuster so that the brake chamber does not have to move as far to accomplish the brake engagement.

This requires the operator to crawl under the vehicle and visually inspect the brake chamber push-rod adjustment. Because of the inconvenience, many operators do not perform the inspection on a regular basis.

It is clear that there is a significant need for a monitoring system which operates automatically and is monitored from inside the vehicle, eliminating the need for the operator to crawl under the vehicle.

SUMMARY OF THE INVENTION

The present invention creates a monitoring system for a vehicle's air-brakes in which the push-rod extending from the brake chamber engages an electrical switch. Air-brakes are used in a variety of vehicles including: buses, semi-trucks, dump-trucks, and a variety of transports.

The air-brake uses an brake chamber which is pressurized with air during the braking procedure. This air, pneumatically extends a push-rod which is interconnected to the brake shoe itself. The interconnection between the push-rod and the brake shoe, due to wear of the system, periodically needs to be adjusted to keep the brake fully operational. Adjustment is necessary to cause effective braking.

This system monitors the brake system so that a warning is given when the push-rod nears the point of requiring adjustment. An electrical switch is mounted to the brake chamber. The electrical switch uses an arm which engages and monitors the length of movement of the push-rod during the braking action. In this manner, each time the brake is engaged, the length of extension of the push-rod is checked to see if the length is within tolerance.

The electrical switch, if moved past a pre-selected position transmits electrical energy to or signals an alarm within the cab of the vehicle where either an auditory alarm is sounded, or a warning lamp is illuminated. While some embodiments utilize an auditory alarm to alert the vehicle's operator, the preferred embodiment illuminates a light so that the operator is alerted to the need for brake adjustment.

Should the alarm be given, then the operator is able to take the appropriate action to remedy the situation. In some applications, this remedial action is to report the incident at the end of the work period; in other situations, the operator would take immediate action by performing the adjustment himself.

The monitoring system itself is operationally checked through the use of several alternative mechanisms. The preferred embodiment of the invention allows the operator to check the integrity of the monitoring system. This self-check capability reduces the chance of a defect in the monitoring system.

In one such check mechanism, a switch is located near the warning lamp in the cab of the vehicle. This switch is controlled by the operator and allows the operator to transmit electrical energy to the remote switch located at the push-rod. This electrical energy is communicated back to the warning lamp which, if not illuminated when the operator engages the switch, indicates that there is a defect in the monitoring system.

In the preferred check mechanism, the operator check switch located near the warning lamp in the cab engages a solenoid which pushes the remote switch (located near the push-rod) into a transmitting position to check the entire monitoring system. This preferred check mechanism allows the operator to test the complete brake warning system with the simple push of a button.

In one embodiment of the invention, through the use of a flip-flop switch, once the warning lamp has been activated, the lamp remains illuminated so that, when the vehicle is returned to the garage at the end of the service period, the mechanic is easily able to determine that the brakes need to be adjusted.

It is clear therefore that the present invention permits the operator to check his/her brake system from the cab of the vehicle. This is accomplished using a warning system which is activated by a switch which transmits a signal when the push-rod from the brake chamber reaches a point, near, but not at, the limit of the range of motion for the brake chamber.

In this context, the signal being transmitted by an electrical signal or a transmitted signal (i.e. on an F.M. frequency or microwave frequency) which causes the alarm to be given.

In the preferred embodiment, each wheel is equipped with a sensor that is hooked to a ground wire back to a warning device inside the vehicle. If the brake becomes "out of" adjustment, the sensor activates, sending a signal to the warning device inside the cab of the vehicle, thus alerting the operator that the brakes need adjusting.

While a variety of warning signals are available, including buzzers, the preferred warning device uses two lights, one for the front brakes and one for the rear brakes. Further, a check switch is available to test that the bulbs within the warning lights are functioning properly.

In this manner, during normal use of the brakes, the brake system is checked by monitoring the brake chamber's push-rod position. Should the operator depress the brake pedal and see a warning light illuminated, then the operator knows that the push-rod to brake connection needs adjustment. At the next opportunity, or when the vehicle is brought in at the end of the day, adjustment to the brake is then made.

The invention, together with various embodiments thereof, is more fully illustrated by the accompanying drawing.

DRAWINGS IN BRIEF

Figure 7:
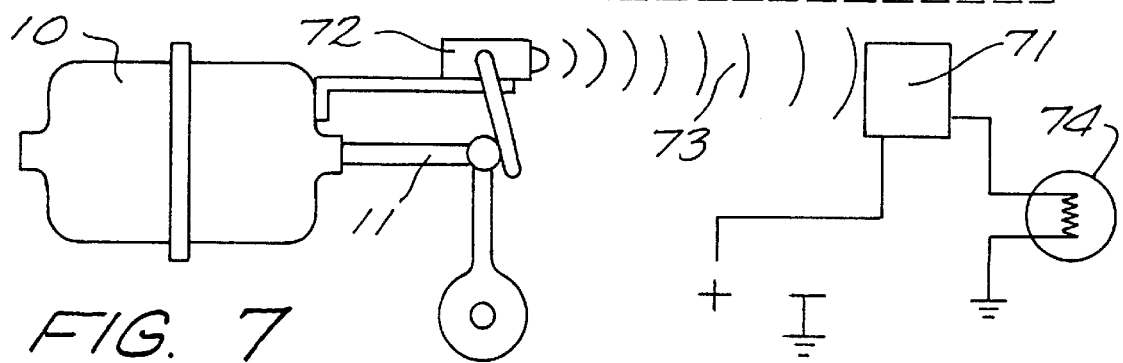

FIG. 7 diagrams an embodiment of the invention which uses a wire-less communication between the sensor and the alarm.

DRAWINGS IN DETAIL

Figure 1:
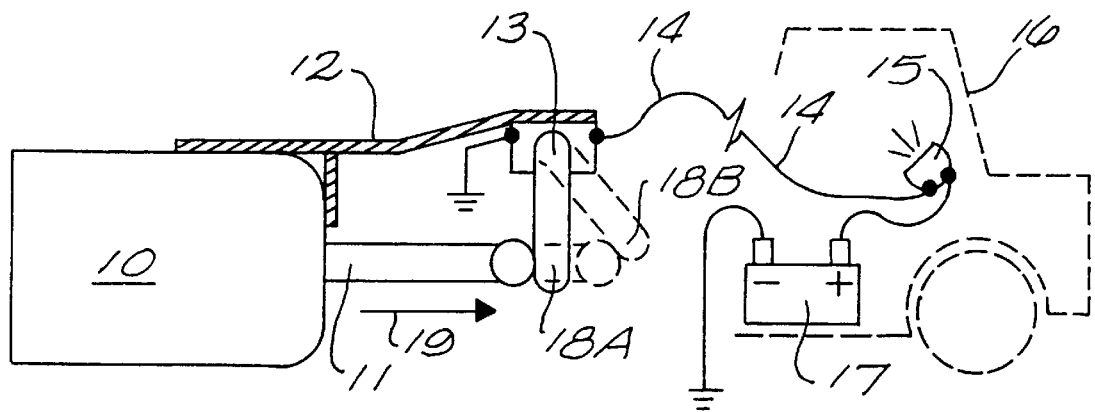
FIG. 1 is an operational diagram of the preferred embodiment of the invention.

FIG. 1 is an operational diagram of the preferred embodiment of the invention.

Brake chamber 10 is typically mounted onto the axle of the vehicle and is selectively supplied pressurized air when the operator depresses the brake pedal in the cab of the vehicle. Changes in air-pressure within brake chamber 10 causes movement of push-rod 11 as indicated by arrow 19.

Attached to brake chamber 10, is bracket 12 which positions switch 13 so that lever 18A is moved by movement of push-rod 11. When the lever is in the position indicated by lever 18B, switch 13 is activated causing electrical energy to flow via electrical wire 14 to alarm 15 within cab 16 of the vehicle.

Electrical energy for the system is provide by the vehicle's battery 17.

Figure 2:
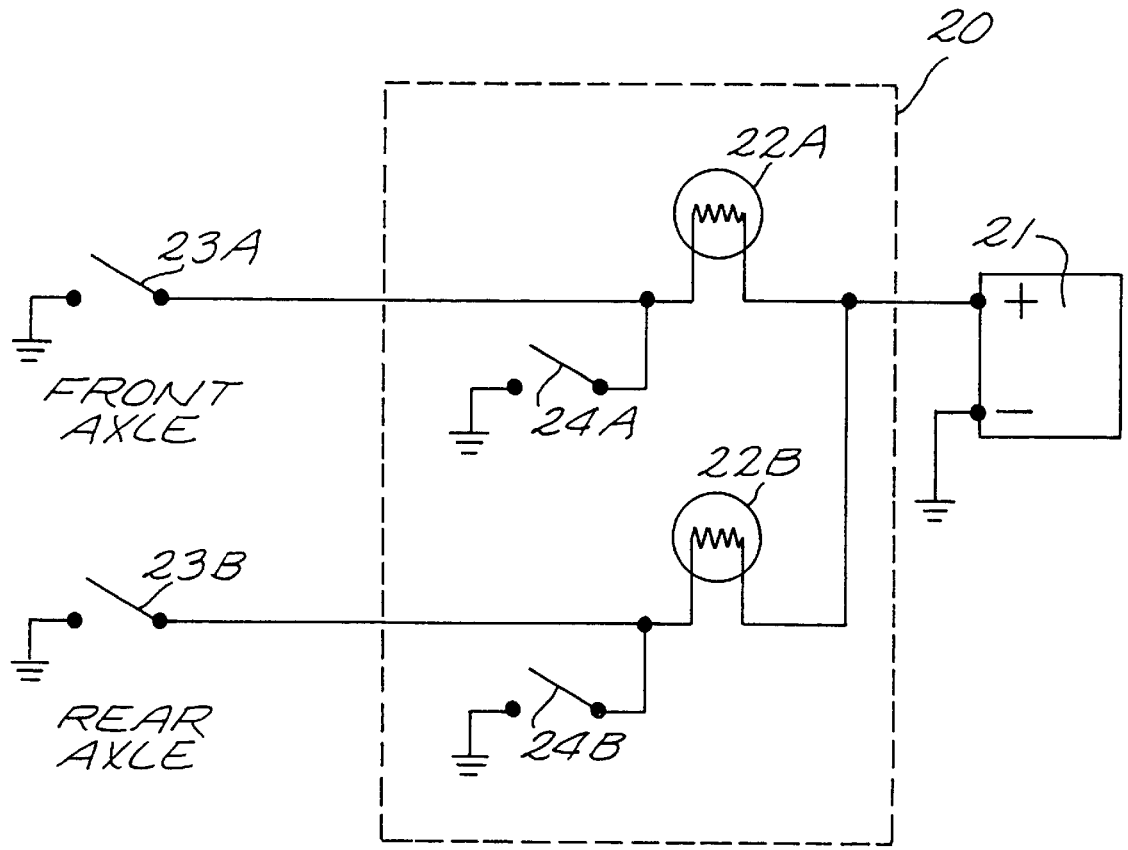
FIG. 2 is an electrical schematic of the preferred embodiment of the invention.

FIG. 2 is an electrical schematic of the preferred embodiment of the invention.

Power to lights 22A and 22B within the dashboard alarm 20 is provided by battery 21. Completion of the circuit is accomplished in two different ways:

(1) the switch at the axle (either front or rear) 23A or 23B is closed indicating that the brakes need adjustment; or, (2) the switch, 24A or 24B, within the dashboard alarm 20 is manually closed by the operator to test the bulbs within the warning system.

Figure 3:
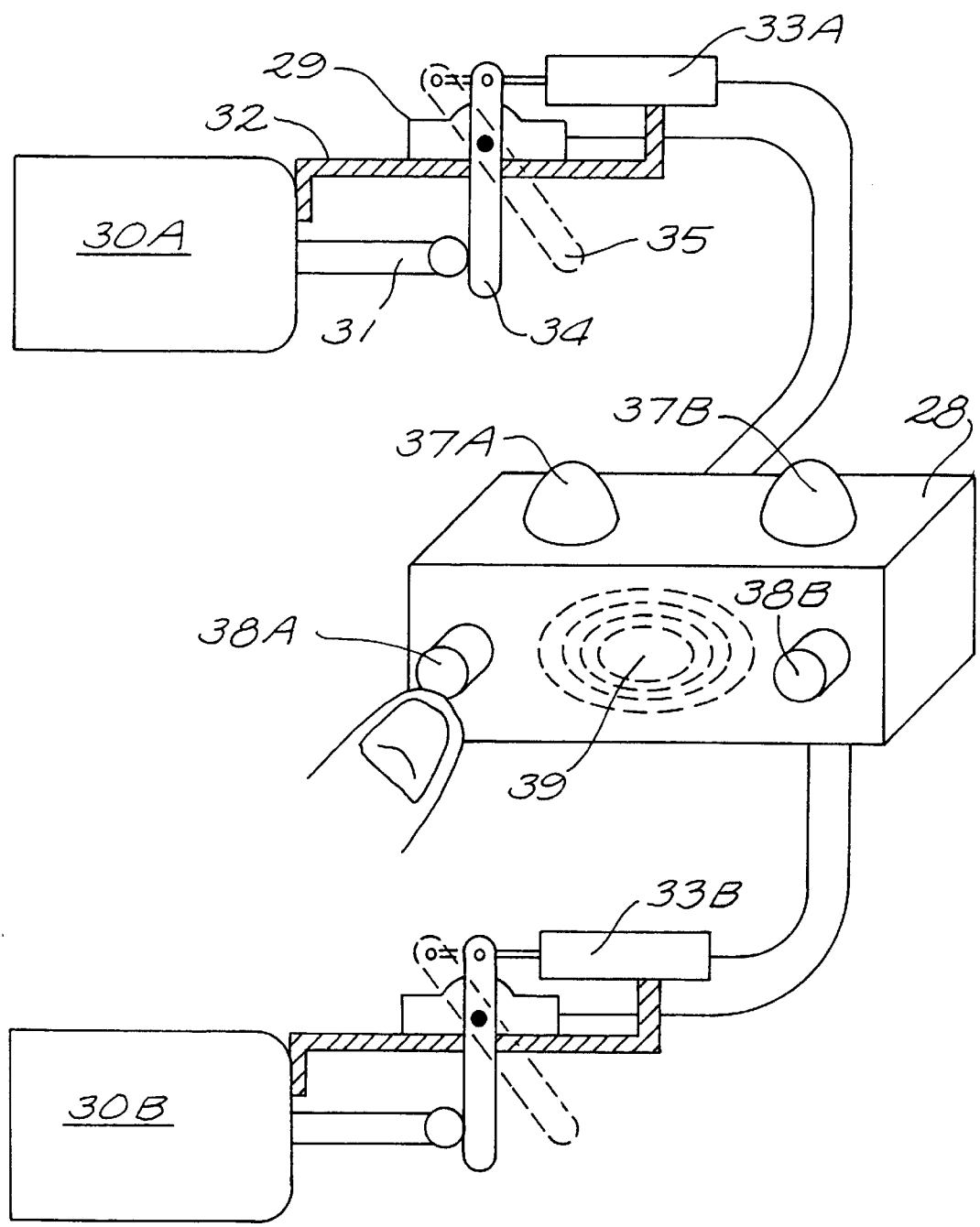
FIG. 3 is a lay-out of the preferred testing mechanism using solenoids to move the actuator arm of the remote switch.

FIG. 3 is a lay-out of the preferred testing mechanism using solenoids to move the actuator arm of the remote switch.

In this illustration, two brake chambers 30A and 30B are used on the vehicle. Each system is substantially identical and the explanation for brake chamber 30A is representative of the action of brake chamber 30B.

Brake chamber 30A uses push-rod 31 to engage a vehicle's brake. Bracket 32 positions switch 29 so that activation lever 34 is engaged by push-rod 31. Should push-rod 31 force the lever of switch 29 to position 35, the circuit is completed causing electrical energy to flow to dash-board alarm 28.

When electrical energy is received from switch 29, warning light 37A is activated. In a similar manner, warning light 37B is used to alert the operator of the need for adjustment of the braking system associated with brake chamber 30B.

To test the operational capabilities of the system, the operator presses upon electrical switch 38A which causes solenoid 33A to extend its ram. The ram of solenoid 33A is connected to lever 34. The extension of the ram of solenoid 33A causes the lever of switch 29 to move in a manner mimicking an out-of-adjustment state (indicated by lever 35) which causes, if the system is working properly, to pass electrical energy to warning light 37A. Should warning light 37A not be illuminated when the operator presses switch 38A, then there is a defect in the monitoring system itself.

In a similar manner, electrical switch 38B activates solenoid 33B to test the monitoring system associated with brake chamber 30B.

In this embodiment, dash-board alarm 28 is also equipped with speaker 39 which buzzes to further alert the operator that adjustment of the brakes is required.

Using the present invention, whenever the operator engages the brakes, the brakes are automatically checked for proper adjustment.

Figure 4:
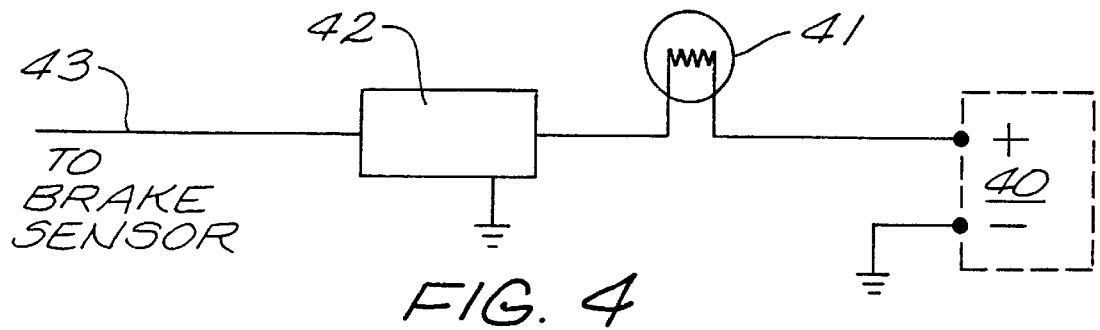
FIG. 4 is an electrical schematic of an embodiment of the invention using a flip-flop switch to assist mechanics in identifying brakes which need to be adjusted.

FIG. 4 is an electrical schematic of an embodiment of the invention using a flip-flop switch to assist mechanics in identifying brakes which need to be adjusted.

In some situations, the operator of the vehicle is not the one who will be doing the adjustment of the brakes. Rather, a mechanic checks the vehicle when it is returned to the garage at the end of the shift.

To facilitate the mechanic in this task, one embodiment of the invention uses flip-flop switch 42 which is activated by signals from the brake sensor switch 43. Once activated, flip-flop switch 42 remains activated causing lamp 41 to be constantly illuminated using electrical energy from battery 40.

Figure 5:
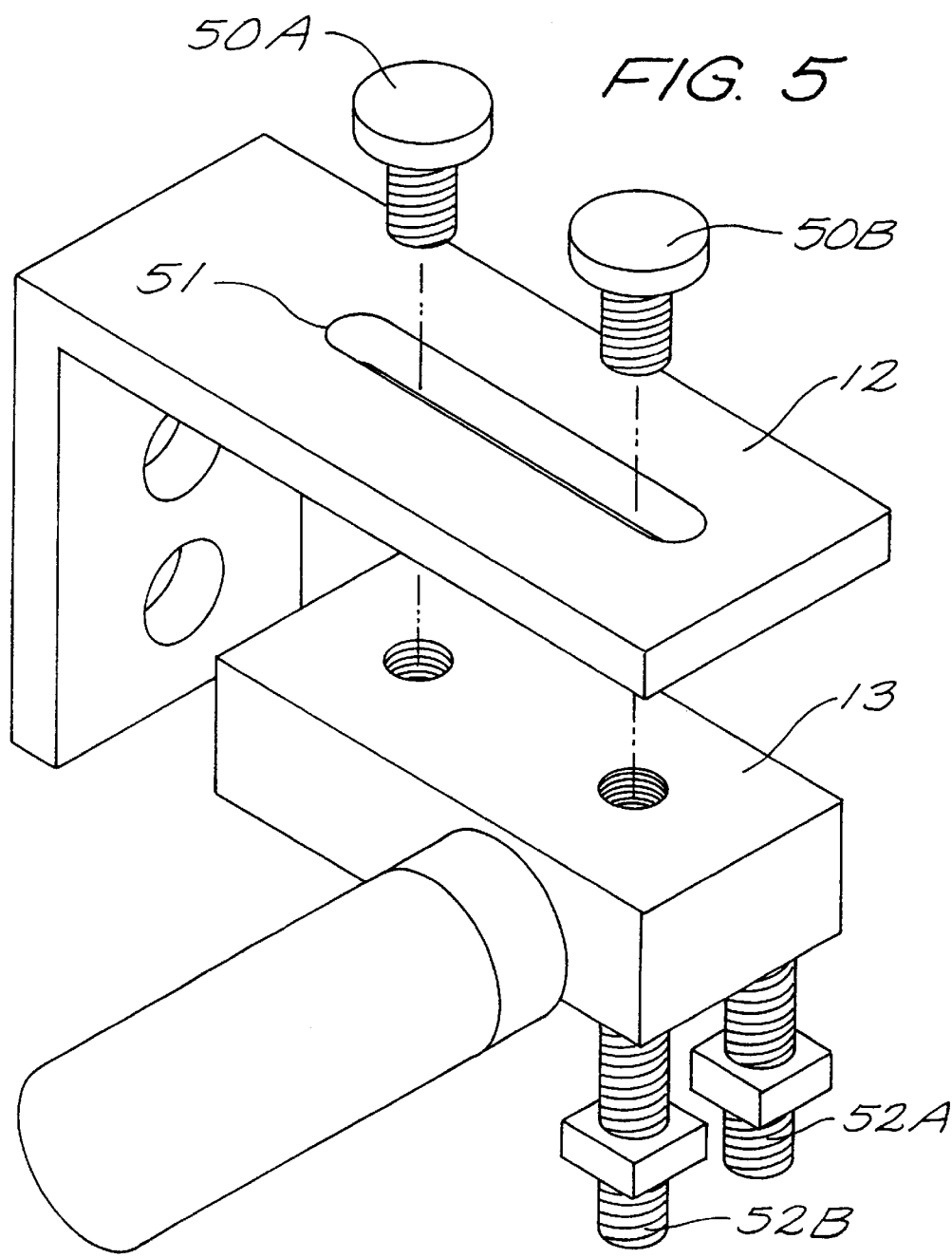
FIG. 5 is perspective view of an embodiment of the invention illustrating the adjustability of the push-rod sensor switch.

FIG. 5 is perspective view of an embodiment of the invention illustrating the adjustability of the push-rod sensor switch.

Bracket 12 is configured to be mounted onto the brake chamber or other suitable position. Once bracket 12 is mounted, switch 13 is secured to bracket 12 using bolts 50A and 50B which extend through slot 51. Using slot 51, switch 13 is moved laterally until proper alignment is obtained.

Electrical poles 52A and 52B are then used to connect switch 13 to a wire which communicates with the dashboard alarm (not shown in this illustration).

Figure 6:
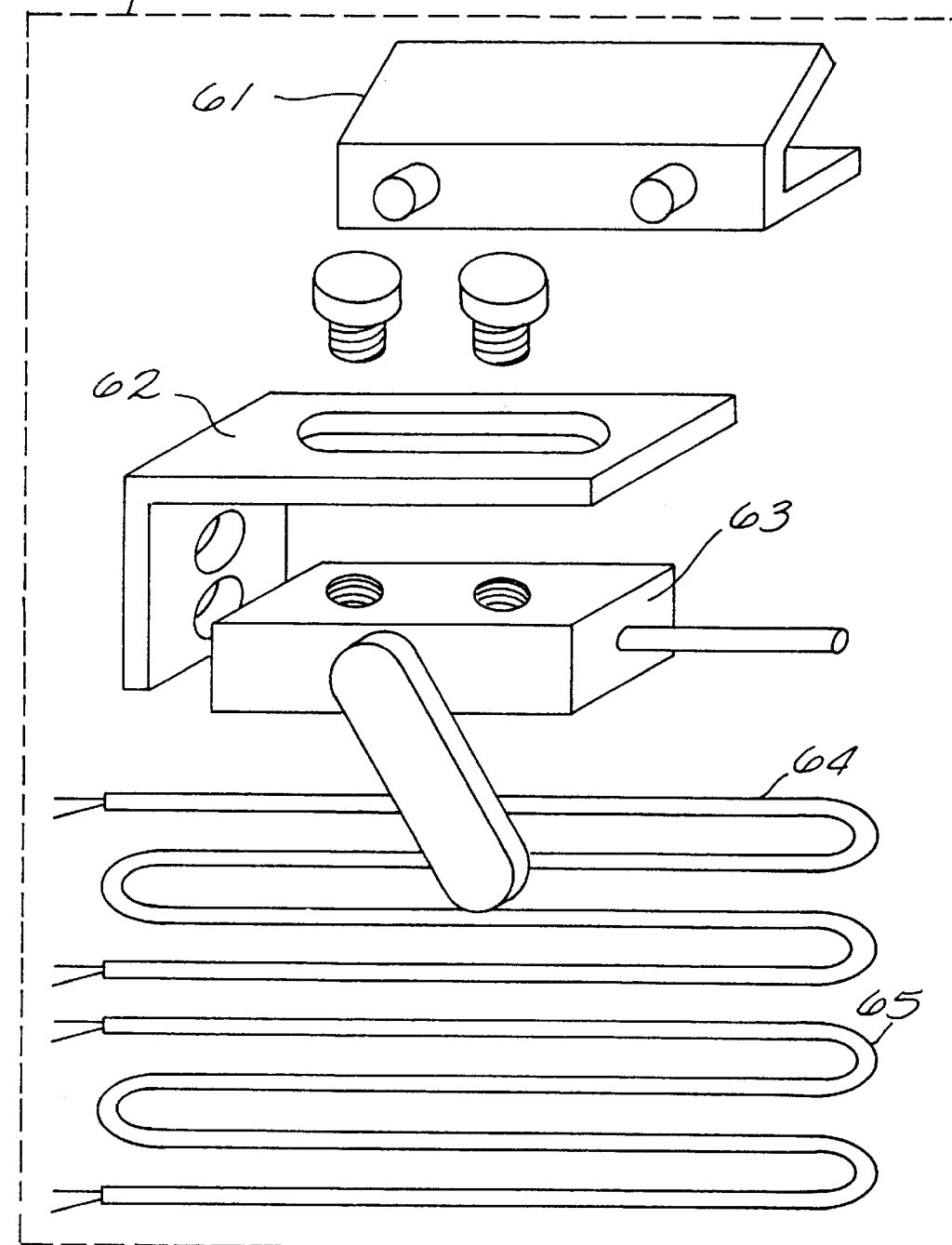
FIG. 6 is a layout of the kit form of the invention.

FIG. 6 is a layout of the kit form of the invention.

For a large number of vehicles, there is an existing need to retro-fit the monitoring system onto their braking systems. To meet this requirement, kit 60 contains: a dashboard alarm unit 61, bracket 62, remote switch 63, and electrical wires 64 and 65. Installation is accomplished easily by a mechanic.

In some kits, other wires are provided as well as speakers for auditory alarms are provided.

The kit provides the mechanic everything that is required to install the monitoring system onto a vehicle.

FIG. 7 diagrams an embodiment of the invention which uses a wire-less communication between the sensor and the alarm.

Brake chamber 10 is adapted to extend push-rod 11 which engages switch 72. In this embodiment, switch 72 emits signal 73 which is communicated to receiver 71. Signal 73 is communicated via the air and does not require any wiring between switch 72 and receiver 71. The frequency and character of signal 73 are obvious to those skilled in the art and include signals in the f.m. band and the microwave band.

Receiver 71, upon activation by the signals 73, receiver 71 activates warning lamp 74.

It is clear that the present invention creates a highly improved monitoring system which accurately monitors an air-brake's performance and notifies the operator when adjustment needs to be made.

What is claimed is:

1. A vehicle braking and monitoring system comprising:
   a) an air-brake activated by air pressure driving a push-rod from a brake chamber;

b) an electrical switch secured to said brake chamber and adapted to transmit electricity when said push-rod is extended past a selected position during braking of the vehicle;

c) an alarm located within a cab of the vehicle, said alarm responsive to electrical signals from said electrical switch;

d) a solenoid adapted to move said electrical switch past said selected position; and, e) a manually operated switch located proximate to said warning light, said manually operated switch adapted to selectively activate said solenoid.

2. The system according to claim 1 wherein said alarm includes means for sounding an auditory alarm.

3. The system according to claim 1 further including a warning light, and wherein said alarm includes means for illuminating said warning light.

4. The system according to claim 3 further including a flip-flop switch activated by said electrical switch, said flip-flop switch, once activated, constantly providing electrical energy to said warning light.

5. A monitoring system for an air-brake activated by air pressure driving a push-rod from a brake chamber, said monitoring system comprising:

a) an electrical switch adapted to transmit a signal when said push-rod is extended past a selected position;

b) an alarm being responsive to said signal from said electrical switch;

c) a solenoid adapted to move said electrical switch past said selected position; and, d) a warning device having,
1) a warning light, and,
2) a manually operated switch selectively communicating electrical energy to said solenoid.

6. The monitoring system according to claim 5 wherein said alarm includes means for sounding an auditory alarm.

7. The monitoring system according to claim 5 further including a flip-flop switch, said flip-flop switch being activated by said electrical switch such that, once activated, said flip-flop switch constantly provides electrical energy to said warning light.

8. A vehicle comprising:

a) at least two axles, each of said axles having a braking mechanism having,
1) an air cylinder activated by air pressure for extending a push-rod from a brake chamber,
2) a brake adapted to press against a rotating wheel member in response to pressure from said push-rod,
3) an electrical switch secured to said brake chamber and adapted to transmit electricity when said push-rod is extended past a selected position during braking of the vehicle, and,
4) a solenoid adapted to move said electrical switch past said selected position; and, b) an alarm located within a cab of the vehicle, said alarm having at least two alarm lights, each of said alarm lights being responsive to one of said electrical switches;

c) at least two manually operated switches located within the cab of said vehicle, each of said at least two manually operated switched adapted to selectively activate one of said solenoids.

9. The vehicle according to claim 8 wherein said alarm further includes means for sounding an auditory alarm.

10. A kit for monitoring a vehicle braking system comprising:

a) a mounting bracket securable to a brake chamber of an air-brake system;

b) an electrical switch having a first and a second electrical pole and adapted to be adjustable and securable to said mounting bracket member such that said electrical switch, when mounted on said mounting bracket, contacts a push-rod extending from said brake chamber;

c) a first electrical wire connectable between the first electrical pole of said electrical switch and a battery of said vehicle;

d) an alarm being responsive to electrical energy and mountable to a dash of said vehicle; and e) a second electrical wire connectable between said second pole of said electrical switch and said alarm;

f) a solenoid connectable to said mounting bracket and adaptable to move said electrical switch;

g) a manually operated switch having a first and a second electrical pole, said manually operated switch located proximate to said alarm;

h) a third electrical wire connectable between said battery and the first electrical pole of said manually operated switch; and, i) a fourth electrical wire connectable between the second electrical sole of said manually operated switch and said solenoid.

\* \* \* \* \*